United States Patent
Nambannor Kunnath et al.

(10) Patent No.: US 12,495,025 B2
(45) Date of Patent: Dec. 9, 2025

(54) ZERO-TRUST VIRTUAL DESKTOP INFRASTRUCTURE AUTHENTICATION

(71) Applicant: Omnissa, LLC, Mountain View, CA (US)

(72) Inventors: Ramanandan Nambannor Kunnath, Bangalore (IN); Rohit Pradeep Shetty, Bangalore (IN)

(73) Assignee: Omnissa, LLC, Mountain View, CA (US)

(*) Notice: Subject to any disclaimer, the term of this patent is extended or adjusted under 35 U.S.C. 154(b) by 102 days.

(21) Appl. No.: 18/349,370

(22) Filed: Jul. 10, 2023

(65) Prior Publication Data

US 2025/0023853 A1   Jan. 16, 2025

(51) Int. Cl.
*H04L 9/40* (2022.01)
*G06F 9/455* (2018.01)

(52) U.S. Cl.
CPC .......... *H04L 63/08* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 2013/0091585 A1* | 4/2013 | Dumais | H04W 12/082 726/27 |
| 2013/0326072 A1* | 12/2013 | Smyth | H04L 67/141 709/227 |
| 2016/0065690 A1* | 3/2016 | Hanyu | G06F 9/45558 715/746 |
| 2022/0232004 A1* | 7/2022 | Soman | G06N 20/00 |
| 2022/0417319 A1* | 12/2022 | Kelly | H04L 67/141 |
| 2023/0418947 A1* | 12/2023 | Vajravel | G06F 21/554 |

* cited by examiner

Primary Examiner — Raqiul A Choudhury
(74) Attorney, Agent, or Firm — Kim & Stewart LLP

(57) ABSTRACT

Various examples are disclosed for a zero-trust authentication model for virtual desktop infrastructure (VDI) sessions. Upon user authentication of a VDI session, security posture assessments can be performed that analyze an ongoing or continuous state of the user, client device, or network conditions. Remedial measures or mitigation procedures can be performed to address potential non-compliance of the VDI session.

14 Claims, 4 Drawing Sheets

ZERO-TRUST VIRTUAL DESKTOP INFRASTRUCTURE AUTHENTICATION

BACKGROUND

Users in enterprise environment are increasingly mobile. Some users may work remotely from home, other users may travel frequently between various offices of an enterprise, and some users might work exclusively on the road from hotels, coffee shops, and the like. Additionally, enterprises are increasingly utilizing virtual desktop infrastructure (VDI) environments and other virtualized computing environments to provide users with a consistent and secure computing environment. Providing a VDI environment requires creating a virtualized version of a physical device, such as a server, a storage device, a central processing unit (CPU), a graphics processing unit (GPU), or other computing resources that can accessed through a VDI client by a remote user. Other remote or virtualized computing resources can also be provided to users. For instance, a virtual machine (VM) is an emulation of a computer system and can be customized to include, for example, a predefined amount of random access memory (RAM), hard drive storage space, as well as other computing resources that emulate a physical machine. As virtual machines resemble physical computer architectures, virtual machines can provide the equivalent functionality of a physical computer. Virtual machines can be executed remotely, in a data center for example, to provide remote desktop computer sessions for employees of an enterprise. In an environment where workers are increasingly mobile and remote, authentication of users can be an important step in securing access to enterprise resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the zero-trust access control in a computing environment. The computing environment can provide a virtual desktop infrastructure (VDI) environment, another type of virtualized environment, or other computing services to users of an enterprise. As one example, various organizations are moving away from providing and maintaining purely physical desktops for their user bases and, instead, are moving towards providing VDI environments. As another example, an organization might utilize one or more virtual machines (VMs) to provide other types of computing services to its users, such as email access, development environments, testing environments, or other services that are deployed in one or more virtual or physical data centers.

As users and workforces become increasingly geographically dispersed and increasingly mobile, their locations and other conditions under which the user connects to a VDI session can change more often. In an enterprise environment that relies upon users to access a computing environment, such as a VDI environment, a virtual machine environment, or other computing environments that rely on network interconnectivity, access to these resources is important.

According to various examples provided herein, a computing environment can assess usage of a VDI session to determine the security posture of a user, a client device from which the user is connecting, network conditions, location of the client device, and other parameters in addition to authentication credentials and secondary authentication factors to provide zero-trust assessment for the VDI sessions. In some examples, the computing environment can take remedial actions on a VDI sessions where an ongoing assessment of the session indicates that conditions under which the client device or user is connecting have changed. The remedial actions can include a restricted VDI session, a time-restricted VDI session, or a paused VDI session, among others. Thus, the present application, and the examples described herein, are directed to improving the performance of a computer network, namely, by improving the operation of hosts and related computing resources in a data center that provides, for instance, a virtualization environment that provides virtual desktop sessions for end users.

Figure 1:
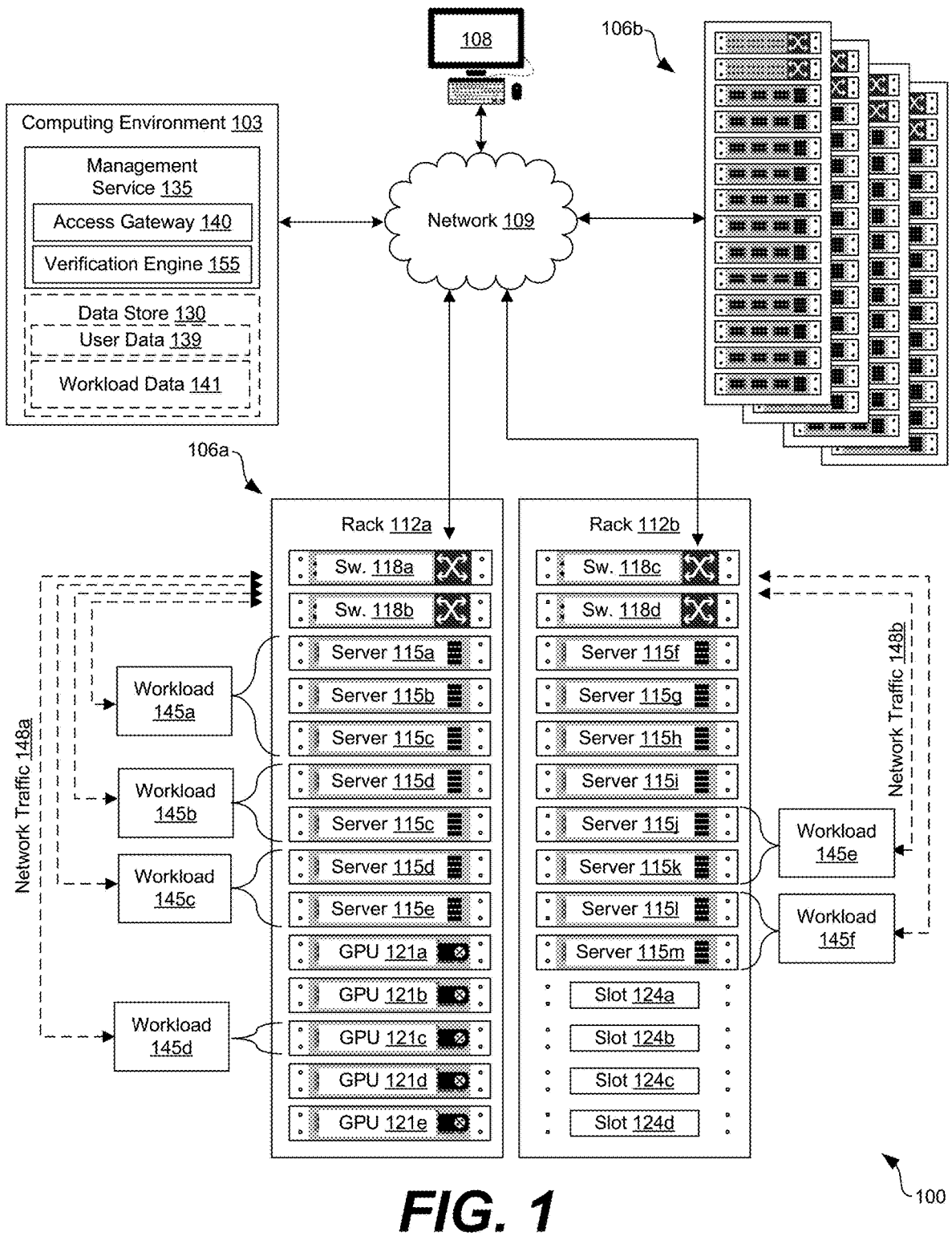
FIG. 1 is a drawing of an example of a virtual desktop infrastructure (VDI) environment according to one example of the disclosure.

With reference to FIG. 1, an example of a networked environment 100 is shown. The networked environment 100 can include a computing environment 103 and various computing systems 106*a* . . . 106*b* in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks. As the networked environment 100 can serve up virtual desktops to end users, the networked environment 100 can also be described as a virtual desktop infrastructure (VDI) environment or computing environment.

In various embodiments, the computing systems 106 can include a plurality of devices installed in racks 112 which can make up a server bank, computing cluster, or a computer bank in a data center or other like facility. The devices in the computing systems 106 can include any number of physical machines, virtual machines, and software, such as operating systems, drivers, hypervisors, and computer applications. In some examples, a computing environment 103 can include an enterprise computing environment that includes hundreds or even thousands of physical machines, virtual machines, and other software implemented in devices stored in racks 112, distributed geographically and connected to one another through the network 109. It is understood that any virtual machine is implemented using at least one physical device.

The devices in the racks 112 can include, for example, memory and storage devices, servers 115*a* . . . 115*m*, switches 118*a* . . . 118*d*, graphics cards (having one or more GPUs 121*a* . . . 121*e* installed thereon), central processing units (CPUs), power supplies, and similar devices. The devices, such as servers 115 and switches 118, can have dimensions suitable for quick installation in slots 124*a* . . .

124*d* on the racks 112. In various examples, the servers 115 can include requisite physical hardware and software to create and manage a virtualization infrastructure. The physical hardware for a server 115 can include a CPU, graphics card (having one or more GPUs 121), data bus, memory, and other components. In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

Additionally, if a server 115 executes a virtual machine, the server 115 can be referred to as a "host," while the virtual machine can be referred to as a "guest." Each server 115 that acts as a host in the networked environment 100, and thereby includes one or more guest virtual machines, can also include a hypervisor. In some examples, the hypervisor can be installed on a server 115 to support a virtual machine execution space within which one or more virtual machines can be concurrently instantiated and executed. In some examples, the hypervisor can include VMware ESX™ hypervisor or a VMware ESXi™ hypervisor. It is understood that the computing systems 106 are scalable, meaning that the computing systems 106 in the networked environment 100 can be scaled dynamically to include additional servers 115, switches 118, GPUs 121, power sources, and other components, without degrading performance of the virtualization environment.

Similarly, the computing environment 103 can include, for example, a server or any other system providing computing capability. Alternatively, the computing environment 103 can include a plurality of computing devices that are arranged, for example, in one or more server banks, computer banks, computing clusters, or other arrangements. The computing environments 103 can include a grid computing resource or any other distributed computing arrangement. The computing devices can be located in a single installation or can be distributed among many different geographical locations. Although shown separately from the computing systems 106, it is understood that in some examples the computing environment 103 the computing systems 106 can be a portion of the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 108 for end users over the network 109, sometimes remotely, the computing environment 103 can be described as a remote computing environment 103 in some examples. Additionally, in some examples, the computing environment 103 can be implemented in servers 115 of a rack 112 and can manage operations of a virtualized computing environment. Hence, in some examples, the computing environment 103 can be referred to as a management cluster in the computing systems 106. In some examples, the computing environment 103 can include one or more top-of-rack (TOR) devices.

The servers 115 of a rack 112 can also provide data storage services for the purpose of storing user data, data relating to workloads 145, and other data. The data can be replicated across different data centers or computing systems 106 that are geographically dispersed. In some cases, a storage area network (SAN) or virtual storage area network (vSAN) can be implemented across different computing systems 106 and/or racks 112. The data stored across the computing systems 106 can include virtual machine images, data accessed by the VM images, VDI images, VDI environments, applications, services, containers, and other data, applications, and services that are utilized by users of the enterprise.

The data can be hosted in certain hosts servers 115 or hosts depending upon where users who access certain data or applications are generally located. For example, a data center providing a VDI environment for users in a particularly city can be located in or near that city rather than on a different continent. Geographic and network proximity to the end users can assist with improving network latency and improve the user experience for users utilizing the data and applications that they generally need. An administrator, when planning a network architecture, can assess what applications and services are generally utilized by its users and locate the applications and data near the respective user populations' physical locations.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. In some examples, the data store 130 can include one or more relational databases, such as structure query language (SQL) databases, non-SQL databases, or other relational or non-relational databases. The data stored in the data store 130, for example, can be associated with the operation of the various services or functional entities described below.

In some examples, the data store 130 can include a database or other memory that includes, for example, user data 139 and workload data 160. User data 139 can store or reference information about the user of an enterprise, such as the user's calendar, email, and other user data. Additionally, user data 139 can include usage logs having records of user interactions with a VDI session served up by the computing systems 106, VMs provided by the computing system 106, or other types of workloads 145. User interactions can include, for example, log-on requests, log-off requests, particular actions performed in a virtualized desktop session, periods of activity or inactivity, as well as other interactions. Each interaction can be stored in the data store 130 in association with a timestamp describing the time the user interaction was performed. One or more location signals associated with the user's location can also be stored in the data store 130 as user data 139.

Workload data 141 can include metadata about the workloads 145 that are deployed across the computing systems 106 in an enterprise deployment. Workloads 145 can include VMs, VDI sessions, containerization services, applications, and other computing resources that users may require. The workload data 141 can identify which server 115, GPU 121, or set of servers 115 and GPUs 121 on which a particular workload 145 is executed. Accordingly, if a user attempts to access a VDI session through the access gateway 140, the access gateway 140 can consult the workload data 141 to determine which server 115 to direct the user's request and where the user's VDI session will be executed.

The components executed on the computing environment 103 can include, for example, a management service 135 as well as other applications, services, processes, systems, engines, or functionality not discussed in detail herein. The management service 135 can be executed to oversee the operation of the networked environment 100 through management of the computing systems 106 as well as the devices and software that make up the computing systems 106. In some examples, an enterprise, organization, or other entity, can operate the management service 135 to oversee or manage the operation of devices in the racks 112, such as servers 115, switches 118, GPUs 121, power supplies, cooling systems, or other components. Through the management service 135, information technology (IT) personnel or other administrators can create virtual desktops, VMs, or other computing resources in a data center capable of being delivered to and accessed by employees or other individuals.

For example, through virtual desktops, end users can be provided with a familiar, personalized environment that they can access from any number of devices from any location while the administrators gain centralized control, efficiency, and security by having desktop data in the data center. However, as users are mobile, locating the user's VDI session to a server 115 in relative proximity to the user's location can improve network latency between the user's client device 108 and the server 115. Additionally, as users become mobile, their location on a given day is not always known in advance. Accordingly, the management service 135, through the prediction engine 115 can generate a predicted location for users so that workloads 145 such as a VDI session can be located in a computing system 106 that optimizes latency to the user's client device 108.

Therefore, in some examples, the management service 135 can include one or more access gateways 140 and a verification engine 155. The access gateway 140 can include an application or other service that acts as a broker for client connections by authenticating and directing incoming user requests to an appropriate virtual machine, virtual desktop, or server 115. The access gateway 140 can include an application or other service that serves any request from a client device 108 for a virtual desktop. The VDI gateway 140 and/or the desktop manager 142 can be configured to store data pertaining to requests from the client devices 108 in a usage log. The data stored in the usage log can include, for example, a type of request performed, a timestamp at which the request was received, as well as other information.

The management service 135 can also include a verification engine 155. The verification engine 155 can process data from user data 129, such as usage logs, a user's calendar, external data sources, or third party hosted services with which the user has an account to generate a predicted location of the user. The verification engine 155 can also process security posture data, such as location data associated with a client device 108, information about a network from which the client device 108 is connecting to a VDI session, and information about the configuration of a client device 108 that is being utilized to connect to the VDI session. The verification engine 155 can analyze one or more pieces of data about the security posture of a client device 108 or a user account associated with a VDI session to determine whether remedial action is needed to further secure the VDI session.

Once an analysis of the security posture of the user, client device 108, network conditions, or other parameters has been completed, the verification engine 155 can cause the management service 135 or the access gateway 140 managing the VDI session of the user to require additional security precautions or authentication mechanisms. For example, the remedial measures imposed by the management service 135 or access gateway 140 can include a restricted VDI session, which can restrict access to certain resources, such as a network connection to external networks from the VDI session, access to single sign-on capabilities can be restricted, and access to certain applications can also be limited or restricted.

Various physical and virtual components of the computing systems 106 can process workloads 145a . . . 145f. Workloads 145 can refer to an application or process that a server 115, switch 118, GPU 121, or other physical or virtual component that have been deployed onto hardware within a computing system 106 or data center. The management service 135 can orchestrate deployment and management of workloads 145 onto servers 115 across a fleet of servers 115 in various geographic locations and data centers. The workloads 145 can be associated with virtual machines or other software executing on the servers 115. For instance, the workloads 145 can include tasks to be processed to provide users of an enterprise with remote desktop sessions or other virtualized computing sessions. The workloads 145 can also represent containerized applications that are running to provide services to users of the enterprise.

In some instances, a workload 145 can require multiple servers 115 to execute. In other instances, a workload 145 can be executed on a single server 115. In many cases, multiple workloads 145, such as multiple VDI sessions, can be deployed on a single server 115 and on data storage resources within the same rack 112 as the server 115.

The management service 135 can maintain a listing of active or inactive workloads 145 as well as oversee the assignment of various workloads 145 to various devices in the computing systems 106. For instance, the management service 135 can assign a workload 145 lacking in available resources to a server 115 that has resources sufficient to handle the workload 145. The workloads 145 can be routed to various servers 115 by the switches 118 as network traffic 148a . . . 148b.

Figure 2:
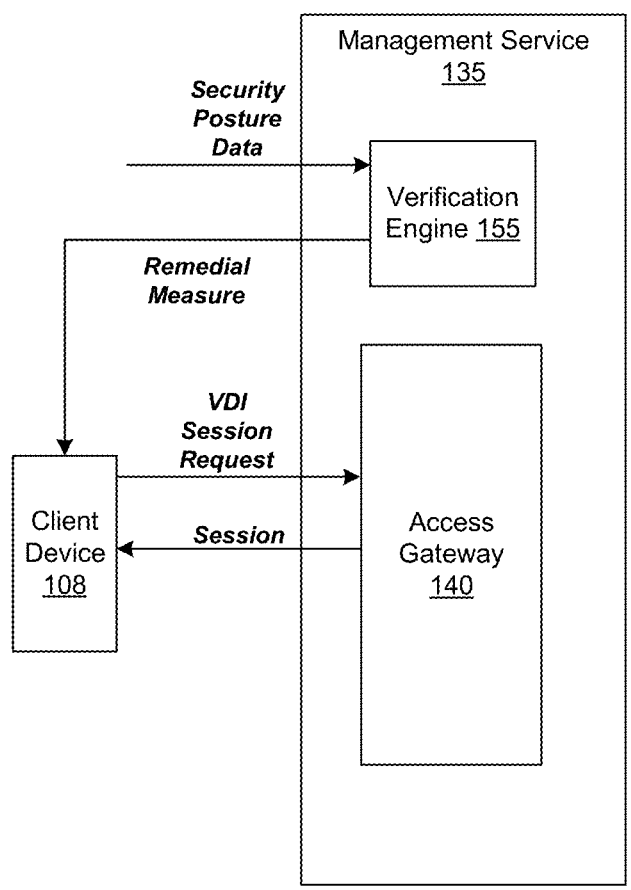
FIG. 2 is a drawing showing an example of a virtual desktop infrastructure (VDI) environment according to one example of the disclosure.

Referring next to FIG. 2, a diagram 200 is provided showing an example of computing architecture for predictive allocation of computing resources according to the disclosure. Again, the computing resources can involve workloads 145, such as VDI sessions, VMs, or other applications and services that are executed by a computing system 106 to provide data and services to a client device 108 of a user. In FIG. 2, the diagram 200 can include includes hosts 203a . . . 203n (collectively "hosts 203") which can include servers 115 which can execute one or more virtual machines 206a . . . 206n. The virtual machines 206 can provide a VDI session or other computing resources when requested by a client device 108. In one example, a client device 108, through a client application running on the client device 108, can send a log-on request to the access gateway 140, which can authenticate the user or client device 108. The access gateway 140 can identify one of the virtual machines 206 to utilize in serving up a virtual desktop for the client device 108. The virtual machines 206 selected by the access gateway 140 can be selected based upon the user account associated with the user and where the user account has been assigned a host 203.

The access gateway 140 can select the appropriate host 203 based upon the workload data 141, which can store a host assignment that relates the requested workload and a host 203. The host assignment can be based on properties of the user account associated with the logon request. The host assignment can be generated by the management service 135 based on an office location assigned to the user, which can be reflected in the user data 139. The host assignment can have a default location based on the assigned office location of the user, which can be an office of the enterprise or a geographic area if the user is a remote user. The host assignment can assign the user to a particular data center in a particular geographic location that is nearest to the user's assigned location.

According to examples of this disclosure, the verification engine 155 can receive location signals that are associated with a user account. Location signals can include usage data associated with a client device 108, such as the location of the client device, the data accessed by the client device, the workloads or VMs utilized by the device, and other signals. The verification engine 155 can also receive information about the network connection or network conditions of the connection between the client device 108 and the host 203. The verification engine 155 can further receive information about the user account of the user. The verification engine 155 can perform at least one security posture assessment associated with a VDI session based upon the data signals to determine whether remedial measures are needed.

Location signals can take various forms. In one example, a location signal can be a location indication on a calendar event on the user's calendar. As noted above, the user data 139 can store or reference the user's enterprise calendar, which can include meetings, events, and appointments. Accordingly, the verification engine 155 can take as an input the location of a calendar event at a particular time or day on the user's calendar to generate a predicted location of the user.

As another example, another location signal can include a location indication received from a radio frequency identification (RFID) or near field communication (NFC) reader that can obtain a swipe or tap from an employee badge, ID card, or client device 108. If the location of the reader is known, when the user authenticates an identifier with the reader, a location signal can be input into the verification engine 155 as an indication that the user is located in or near the location of the reader. For example, many buildings and facilities of an enterprise have physical access control systems that require the user to tap or swipe a badge to authenticate with a reader that unlocks a door or entrance gate. Accordingly, an indication from a reader or access control system that a user has authenticated with the reader can be input as a location signal to the verification engine 155.

Another location signal can include a network address of a client device 108 that is used by the client device 108 when accessing a network accessible service of the enterprise. For example, the network address of the client device 108 can be determined by identifying a network address through which the client device 108 communicates with the management service 135. The network address can be determined using IP address header or other connection properties associated with the client device. Accordingly, a physical or geographic location can be estimated or determined from the network address of the client device 108. Therefore, the network address can be provided as a location signal to the verification engine 155.

Another location signal can include virtual private network (VPN) usage associated with the user or client device 108 of the user. The enterprise might require mobile users to utilize a VPN capability to access network resources or to secure network traffic coming from or to the client device 108. A VPN gateway can record a network address or a location of a client device 108 that is accessing a VPN capability provided by the enterprise. Accordingly, a physical or geographic location can be estimated or determined from the properties of a VPN connection between the client device 108 and a VPN gateway. Therefore, the properties of a VPN connection can be provided as a location signal to the verification engine 155.

Another example of a location signal can include data from third party data sources, such as weather data, data about network conditions between the client device 108 and the access gateway 140. If inclement weather is imminent in a physical location associated with the client device 108, this can be a signal that the workload 145 utilized by the user account associated with the client device 108 should be relocated or reconfigured. If network conditions associated with the client device 108 are degraded such that bandwidth or latency does not meet a bandwidth threshold or latency threshold, this can also be provided to the verification engine 155 as a location signal.

Another example of a location signal can include the current physical or geographic location of a client device 108. The client device 108, in some scenarios, can periodically reports its location to the management service 135 or a service with which the client device 108 is enrolled as a managed device. Accordingly, the location history of the client device 108 can also be provided to the verification engine 155 as a location signal.

A network signal can include a network address of a client device 108 that is used by the client device 108 when accessing a network accessible service of the enterprise. For example, the network address of the client device 108 can be determined by identifying a network address through which the client device 108 communicates with the management service 135. The network address can be determined using IP address header or other connection properties associated with the client device. Accordingly, a physical or geographic location can be estimated or determined from the network address of the client device 108. Therefore, the network address can be provided as a location signal to the verification engine 155.

Another network signal can include virtual private network (VPN) usage associated with the user or client device 108 of the user. The enterprise might require mobile users to utilize a VPN capability to access network resources or to secure network traffic coming from or to the client device 108. A VPN gateway can record a network address or a location of a client device 108 that is accessing a VPN capability provided by the enterprise. Accordingly, a physical or geographic location can be estimated or determined from the properties of a VPN connection between the client device 108 and a VPN gateway. Therefore, the properties of a VPN connection can be provided as a location signal to the verification engine 155.

The verification engine 155 can also receive data about a user account from third party hosted services associated with a user. For example, an enterprise can provide accounts in third party hosted services, such as a customer relationship management tool, a single sign-on service, a bug-tracking system, an email platform, and other services. Access to these accounts can be accomplished through a federated authentication scheme. Accordingly, a data engine can obtain data from various third party services utilizing an authentication token on behalf of a user account and feed data related to the user's location into the verification engine 155 signals that can be evaluated to generate a security posture.

Referring to FIG. 2, shown is an alternative depiction of the management service 135, verification engine 155, access gateway 140 and a client device 108 according to an example. In the depicted scenario, the verification engine 155, using the signals or security posture data that is provided as inputs, can determine a security posture of the VDI session to which the user is connected. Depending upon the security posture determined for the VDI session, the verification engine 155 can require one or more remedial measure to be taken on the VDI session, the user, or the client device 108 from which the user is connecting to the VDI session.

The access gateway 140 can perform an initial authentication of a user in response to a request to create a VDI session from a client device 108 associated with the user. The initial authentication can involve authenticate or verifying the client device 108 and/or user credentials. The user credential authentication can involve authenticating one or more authentication factors, such as a username, password, authentication code, or other secondary authentication factors. Once authenticated, the access gateway 140 can provide access to a VDI session that is powered by the computing systems 106.

The verification engine 155 can perform an ongoing evaluation of security posture data that can be obtained by or on behalf of the verification engine 155. The security posture data can be obtained from the access gateway 140, the computing systems 106, the client device 108, and/or other software or hardware elements from which the ongoing evaluation can be performed. By performing the ongoing evaluation of the security posture data, a zero-trust framework for improving the security of the VDI session is provided.

Continuous evaluation of information about the user, user account, client device 108 and/or network 109 through which the client device 108 is connecting to the VDI session is performed to determine whether remedial measures are needed to further secure the VDI session. The remedial measures and triggering events for the same can be administrator configurable.

Continuous evaluation is performed by the verification engine 155 to verify that there is no change in the associated user posture which might increase the risk of the ongoing VDI session being misused or hijacked. When changes are detected in the user's posture, the existing VDI sessions can be paused and mitigation procedures can be performed by the verification engine 155 or access gateway 140 to verify the user and allow the VDI session to be resumed. In certain cases that involve a drastic change in the security posture of the VDI session, the ongoing VDI session could be terminated or restricted before resumption is permitted.

To perform this continuous evaluation, our system obtains information on the security posture of the user, user account, network, and devices via an application installed on the client device 108, such as a management component installed on the client device 108 to locally manage the client device 108 on behalf of the management service 135. The management component can provide information about the user, client device 108 and/or network conditions associated with the client device 108 or the network 109, and information about the user. For example, the management service 135 or the management component can identify which applications are running or installed on the client device 108, which type of network connection the client device 108 is utilizing, whether a VPN is being utilized, and other aspects of the conditions under which the client device 108 is connected to the VDI session.

The verification engine 155 can determine whether the user, client device 108, or other parameters are compliant with policies set forth by an administrator of the computing systems 106 and should be granted continued access to the VDI session. User or client device 108 location can be evaluated in various ways. A user can access the VDI session using a client device 108 that is enrolled or unenrolled with the management service 135. In some instances, the user might attempt to spoof location data on this device to overcome any location restrictions. To detecting spoofing, the verification engine 155 can utilize the location data available a user's enrolled client device 108 to verify the user's location. On the designated primary enrolled device, a management component installed thereon can periodically access the user's location data and report the same to the management service 135. The verification engine 155 can then determine whether the user is bypassing location restrictions enforced on the end user to access the VDI session. Thus, this policy can be enforced irrespective of whether the device used to access the VDI session is enrolled with the management service 135 as a managed device.

In another instance, environmental data can be evaluated as it relates to the security of a VDI session. The administrator can also configure an environmental compliance policy that does not permit VDI sessions in a crowded or public area. In such cases, the management service 135 or a management component on the client device 108 can provide data from which the verification engine 155 determines if the environment from which the user is accessing the VDI session is a public area. The verification engine 155 can evaluate location data, information about the network connection of the client device 108, ambient sound data captured by the client device 108, or even pictures and video captured by the client device 108. The ambient sound, pictures, and/or video can be captured by a management component or application that is installed with elevated privileges on the client device 108 and/or with the consent of the user In another instances, the verification engine 155 can determine whether applications installed on the client device 108 are flagged as non-compliant by an administrator policy or by a security vendor blacklist. The management component can report information about installed or running applications to the verification engine 155, which can make such a determination. The end user can be restricted from accessing a VDI session if a malicious or non-compliant application is determined to be installed on the client device 108.

The verification engine 155 can be continuously evaluating one or more security posture assessments based upon the security posture data. The security posture data can be monitored in real time so that in case the security posture assessment made by the verification engine 155 fails, the verification engine 155, access gateway 140 or management service 135 can take remedial measures to secure or restrict the VDI session.

The remedial measures can take various forms. In one example, a restricted VDI session can be imposed on the user in which access to resources within the VDI session can be restricted. For example, in the VDI session, the user can be provided with restricted access to the internet, access to resources utilizing single sign-on or federated authentication can be restricted or disabled, and access to certain applications installed within the VDI session can be restricted or eliminated until the user performs an additional authentication or remediates the issues identified by the verification engine 155

As one example of a remedial measure, the verification engine 155 can determine that the VDI session can be time-limited so that the VDI session expires or terminates after a timeout period or until the user performs a needed mitigation to move to a different location, network connection, or other identified mitigation. The timeout period can be extended based upon whether the user performs the identified mitigation. If the user performs a requested mitigation, the timeout period can be extended or eliminated.

VDI sessions can also be paused by the verification engine 155 or access gateway 140 until the user performs a requested mitigation. If the user performs a requested mitigation, the VDI session can be resumed. Suggested mitigations can be requested by the verification engine 155, access gateway 140, or management service 135 by causing a notification to be displayed in the VDI session or on a client device 108 that is enrolled as a managed device with the management service 135. The notification can inform the user about the security issue identified via a security posture analysis and also include information describing how the user can perform the mitigation.

For example, the notification can inform the user that they are located in an area or network from which a VDI session is not permitted and inform the user that the VDI session will be paused, terminated, or time-limited until the user relocates to a permitted location. As another example, the notification can inform the user that a forbidden application is installed on the device from which the VDI session is being conducted and inform the user that the VDI session will be paused, terminated, or time-limited until the user uses a compliant device for the VDI session.

Figure 3:
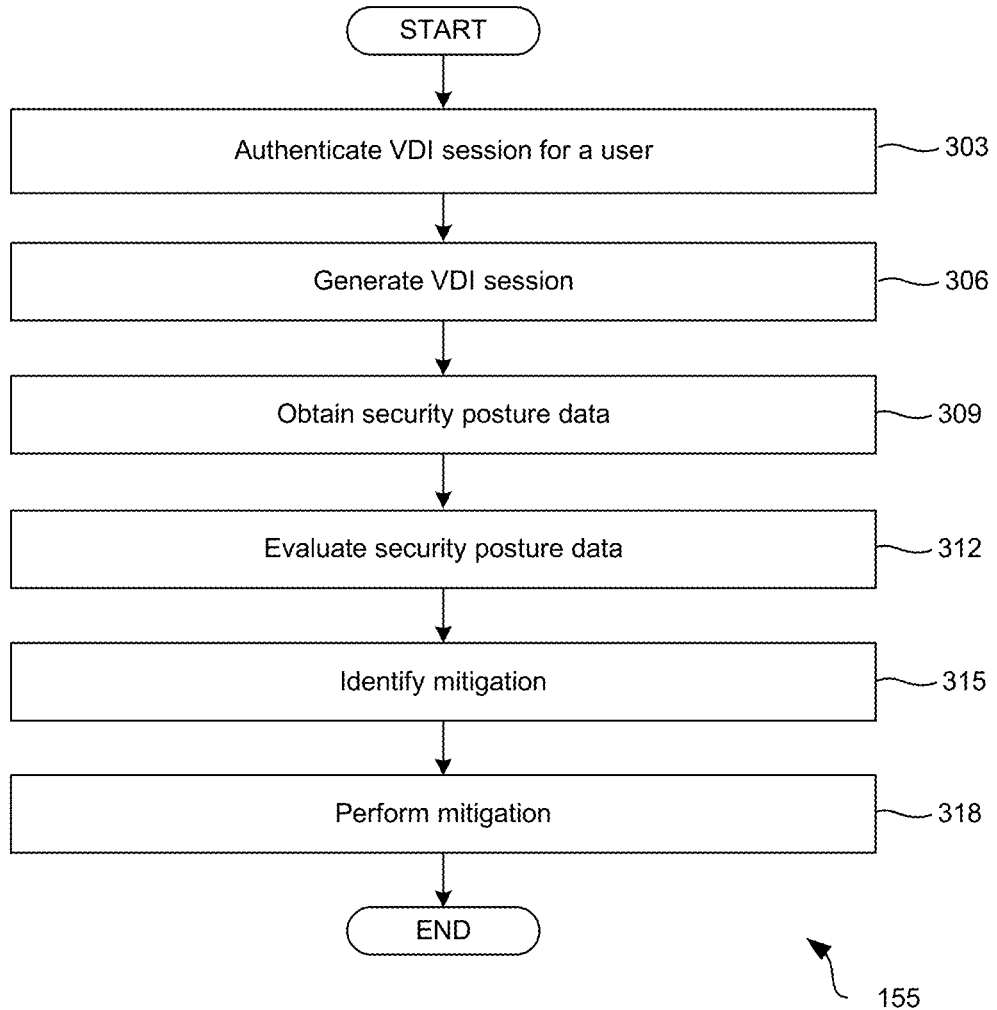
FIG. 3 is a flowchart illustrating functionality implemented by components of the environment of FIG. 1.

Moving on to FIG. 3, shown is a flowchart that provides one example of the operation of a portion of the networked environment 100. The flowchart of FIG. 3 can be viewed as depicting an example of elements of a method implemented by the management service 135 or the verification engine 155 executing in the computing environment 103 according to one or more examples. FIG. 3 illustrates how the verification engine 155 can provide a zero-trust model for authenticating a user's access to a VDI session as well as the conditions under which the user is accessing the VDI session. The separation or segmentation of functionality as discussed herein is presented for illustrative purposes only.

Beginning with step 303, the verification engine 155 or access gateway 140 can authenticate a VDI session on behalf of a user. Authentication can involve authenticating one or more authentication credentials of the user, such as a username, password, secondary authentication token, a physical security key, or a device identifier of a device from which the user is connecting to the VDI session.

At step 306, the access gateway 140 can generate the VDI session on behalf of the user. The VDI session can be executed by one or more VM from the computing systems 106 shown in FIG. 1. The VDI session can comprise a virtual desktop infrastructure session that provides computing resources over the network 109 to a client device 108 of the user.

At step 309, the verification engine 155 can obtain security posture data. The security posture data can include information about the user or a user account, the client device 108 from which the user is connecting to the VDI session, and the network 109 through which the client device 108 is connecting to the VDI session. The security posture data can be obtained from various data sources. Information about a user account of a user can be obtained from the management service 135, an identity provider, a directory service, or any other data source from which user data can be obtained. Information about a client device 108 can be obtained from the management service 135 if the client device 108 is enrolled as a managed device. Client device 108 data can also be obtained from the client device 108, such as from a VDI client installed on the client device 108, a browser application or plug-in, a management application installed on the client device 108, or the operating system of the client device 108. Information about the network 109 can be obtained from the access gateway 140, the client device 108, or an application or service that monitors the network conditions associated with VDI session on behalf of the computing systems 106.

At step 312, the verification engine 155 can evaluate the security posture data. In one example, the verification engine 155 can make multiple security posture assessments. A first security posture assessment could be made about the user data, such as an evaluation of various permissions on a user account. The permissions could indicate a degree to which the user is permitted to conduct a VDI session that is non-compliant. For example, a user with a particular role or ranking within an organization could have more restrictions placed on his or her VDI sessions because the user might have greater access to enterprise resources through the VDI session. Alternatively, a user with a higher role or ranking might have more permissive settings that allow a non-compliant VDI session. As another example, a user with a lower role or ranking within the organization might have fewer restrictions placed on his or her VDI sessions because the user has less access to sensitive enterprise resources through the VDI session.

The verification engine 155 location indication on a calendar event on the user's calendar. As noted above, the user data 139 can store or reference the user's enterprise calendar, which can include meetings, events, and appointments. Accordingly, the verification engine 155 can take as an input the location of a calendar event at a particular time or day on the user's calendar to generate a predicted location of the user.

As another example, another location indication can include a location indication received from a radio frequency identification (RFID) or near field communication (NFC) reader that can obtain a swipe or tap from an employee badge, ID card, or client device 108. If the location of the reader is known, when the user authenticates an identifier with the reader, a location signal can be input into the verification engine 155 as an indication that the user is located in or near the location of the reader. For example, many buildings and facilities of an enterprise have physical access control systems that require the user to tap or swipe a badge to authenticate with a reader that unlocks a door or entrance gate. Accordingly, an indication from a reader or access control system that a user has authenticated with the reader can be input as a location signal to the verification engine 155.

Another location signal can include a network address of a client device 108 that is used by the client device 108 when accessing a network accessible service of the enterprise. For example, the network address of the client device 108 can be determined by identifying a network address through which the client device 108 communicates with the management service 135. The network address can be determined using IP address header or other connection properties associated with the client device. Accordingly, a physical or geographic location can be estimated or determined from the network address of the client device 108. Therefore, the network address can be provided as a location signal to the verification engine 155.

Another location signal can include virtual private network (VPN) usage associated with the user or client device 108 of the user. The enterprise might require mobile users to utilize a VPN capability to access network resources or to secure network traffic coming from or to the client device

108. A VPN gateway can record a network address or a location of a client device 108 that is accessing a VPN capability provided by the enterprise. Accordingly, a physical or geographic location can be estimated or determined from the properties of a VPN connection between the client device 108 and a VPN gateway. Therefore, the properties of a VPN connection can be provided as a location signal to the verification engine 155.

Another example of a location signal can include data from third party data sources, such as weather data, data about network conditions between the client device 108 and the access gateway 140. If inclement weather is imminent in a physical location associated with the client device 108, this can be a signal that the workload 145 utilized by the user account associated with the client device 108 should be relocated or reconfigured. If network conditions associated with the client device 108 are degraded such that bandwidth or latency does not meet a bandwidth threshold or latency threshold, this can also be provided to the verification engine 155 as a location signal.

Another example of a location signal can include the current physical or geographic location of a client device 108. The client device 108, in some scenarios, can periodically reports its location to the management service 135 or a service with which the client device 108 is enrolled as a managed device. Accordingly, the location history of the client device 108 can also be provided to the verification engine 155 as a location signal.

A network signal can include a network address of a client device 108 that is used by the client device 108 when accessing a network accessible service of the enterprise. For example, the network address of the client device 108 can be determined by identifying a network address through which the client device 108 communicates with the management service 135. The network address can be determined using IP address header or other connection properties associated with the client device. Accordingly, a physical or geographic location can be estimated or determined from the network address of the client device 108. Therefore, the network address can be provided as a location signal to the verification engine 155.

Another network signal can include virtual private network (VPN) usage associated with the user or client device 108 of the user. The enterprise might require mobile users to utilize a VPN capability to access network resources or to secure network traffic coming from or to the client device 108. A VPN gateway can record a network address or a location of a client device 108 that is accessing a VPN capability provided by the enterprise. Accordingly, a physical or geographic location can be estimated or determined from the properties of a VPN connection between the client device 108 and a VPN gateway. Therefore, the properties of a VPN connection can be provided as a location signal to the verification engine 155.

Next, at step 312, the verification engine 155 can identify a mitigation based upon the evaluation of the security posture data. The mitigation can comprise time-limiting a VDI session of the user, pausing the VDI session until the non-compliant state is corrected by the user or client device 108, ending the VDI session, or notifying the user that their VDI session is non-compliant. If the VDI session is time-limited, the VDI session can be terminated after a timeout period or until a non-compliant state identified by the evaluation is corrected. If the non-compliant state is corrected, the timeout period can be eliminated or extended. At step 318, the verification engine 155 can perform the mitigation or instruct the access gateway 140, management service 135, or other system managing the VDI session to perform the mitigation on the VDI session. Thereafter, the process can proceed to completion.

Figure 4:
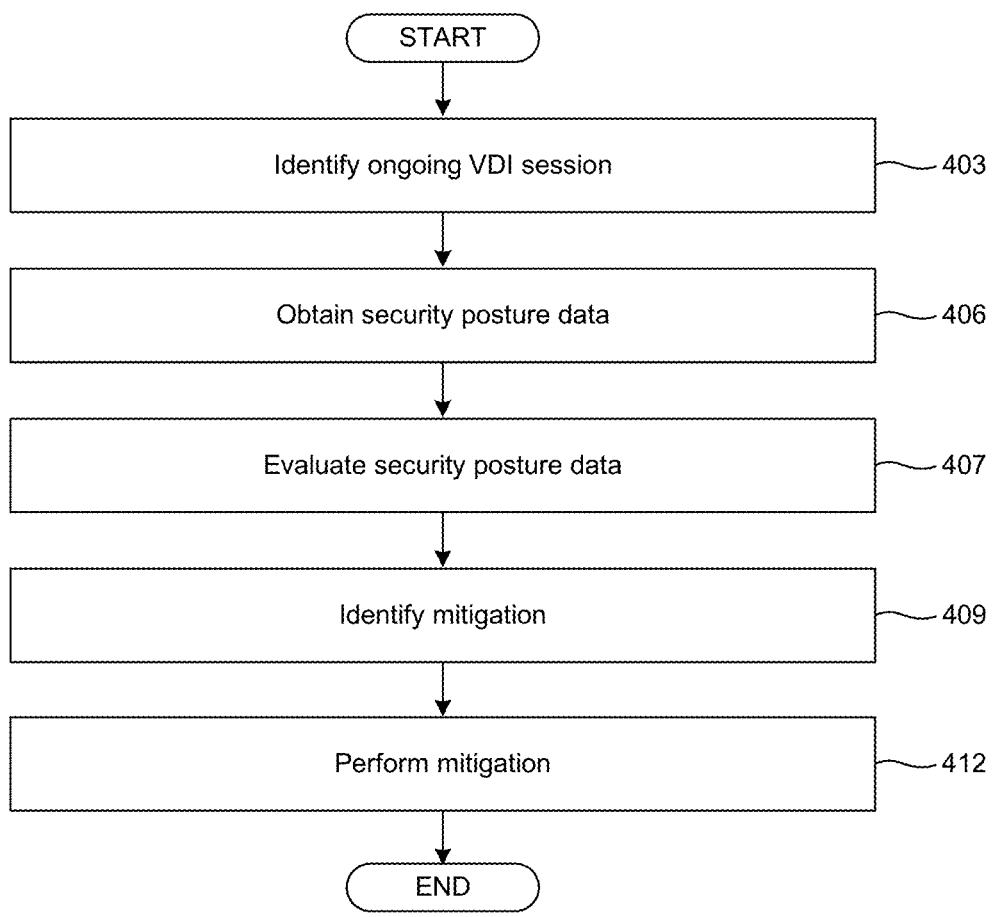
FIG. 4 is a flowchart illustrating functionality implemented by components of the environment of FIG. 1.

Turning now to FIG. 4, shown is a flowchart that provides one example of the operation of a portion of the networked environment 100. The flowchart of FIG. 4 can be viewed as depicting an example of elements of a method implemented by the management service 135 or the verification engine 155 executing in the computing environment 103 according to one or more examples. FIG. 4 illustrates how the verification engine 155 can provide a zero-trust model for ongoing validation of a user's VDI session as well as the conditions under which the user is accessing the VDI session. The separation or segmentation of functionality as discussed herein is presented for illustrative purposes only.

Beginning with step 303, the verification engine 155 or access gateway 140 can identify an ongoing VDI session of a user. The user has previously authenticated and initiated a VDI session, such as in the example flow of FIG. 3.

At step 406, the verification engine 155 can obtain security posture data. The security posture data can include information about the user or a user account, the client device 108 from which the user is connecting to the VDI session, and the network 109 through which the client device 108 is connecting to the VDI session. The security posture data can be obtained from various data sources. Information about a user account of a user can be obtained from the management service 135, an identity provider, a directory service, or any other data source from which user data can be obtained. Information about a client device 108 can be obtained from the management service 135 if the client device 108 is enrolled as a managed device. Client device 108 data can also be obtained from the client device 108, such as from a VDI client installed on the client device 108, a browser application or plug-in, a management application installed on the client device 108, or the operating system of the client device 108. Information about the network 109 can be obtained from the access gateway 140, the client device 108, or an application or service that monitors the network conditions associated with VDI session on behalf of the computing systems 106.

At step 407, the verification engine 155 can perform an evaluation of the security posture data. In one example, the verification engine 155 can make multiple security posture assessments. A first security posture assessment could be made about the user data, such as an evaluation of various permissions on a user account. The permissions could indicate a degree to which the user is permitted to conduct a VDI session that is non-compliant. For example, a user with a particular role or ranking within an organization could have more restrictions placed on his or her VDI sessions because the user might have greater access to enterprise resources through the VDI session. Alternatively, a user with a higher role or ranking might have more permissive settings that allow a non-compliant VDI session. As another example, a user with a lower role or ranking within the organization might have fewer restrictions placed on his or her VDI sessions because the user has less access to sensitive enterprise resources through the VDI session.

Next, at step 409, the verification engine 155 can identify a mitigation based upon the evaluation of the security posture data. The mitigation can comprise time-limiting a VDI session of the user, pausing the VDI session until a non-compliant state has been corrected by the user or client device 108, ending the VDI session, or notifying the user that their VDI session is non-compliant or that a non-compliant state has been detected. At step 412, the verification engine 155 can perform the mitigation or instruct the access gateway 140, management service 135, or other system managing the VDI session to perform the mitigation on the VDI session. Thereafter, the process can proceed to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 135. These client devices 108 can include a display upon which a user interface generated by a client application for providing a virtual desktop session (or other session) can be rendered. In some examples, the user interface can be generated using user interface data provided by the computing environment 103. The client device 108 can also include one or more input/output devices that can include, for example, a capacitive touchscreen or other type of touch input device, fingerprint reader, or keyboard.

Although the management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
at least one computing device;

program instructions stored in memory and executable in the at least one computing device that, when executed by the at least one computing device, cause the at least one computing device to:
  authenticate a virtual desktop infrastructure (VDI) session associated with a user based upon at least one authentication mechanism;
  obtain a first security posture of a user account associated with the VDI session;
  obtain a second security posture of at least one of a network or a client device from which the user account is connecting to the VDI session;
  perform an evaluation of the first security posture and the second security posture;
  determine that a mitigation procedure is required based upon identifying a non-compliant state by the evaluation of the first security posture and the second security posture;
  identify a mitigation based upon the evaluation; and
  perform the mitigation to at least one of the VDI session, the user account, or the client device, wherein the mitigation comprises terminating the VDI session after a timeout period and wherein the timeout period is extended or eliminated in response to the user correcting the non-compliant state identified by the evaluation.

2. The system of claim 1, wherein the mitigation comprises performing another user authentication of the user based upon the at least one authentication mechanism.

3. The system of claim 1, wherein the evaluation of the first security posture and the second security posture comprises a continuous evaluation of the VDI session after an initial startup of the VDI session.

4. The system of claim 1, wherein the mitigation comprises pausing the VDI session until the non-compliant state identified by the evaluation is corrected.

5. The system of claim 1, wherein the mitigation comprises generating a notification within the VDI session containing information about the non-compliant state identified by the evaluation.

6. A non-transitory computer-readable medium embodying program code executable in at least one computing device that, when executed by the at least one computing device, causes the at least one computing device to:
  authenticate a virtual desktop infrastructure (VDI) session associated with a user based upon at least one authentication mechanism;
  obtain a first security posture of a user account associated with the VDI session;
  obtain a second security posture of at least one of a network or a client device from which the user account is connecting to the VDI session;
  perform an evaluation of the first security posture and the second security posture;
  determine that a mitigation procedure is required based upon identifying a non-compliant state by the evaluation of the first security posture and the second security posture;
  identify a mitigation based upon the evaluation; and
  perform the mitigation to at least one of the VDI session, the user account, or the client device, wherein the mitigation comprises terminating the VDI session after a timeout period and wherein the timeout period is extended or eliminated in response to the user correcting the non-compliant state identified by the evaluation.

7. The non-transitory computer-readable medium of claim 6, wherein the mitigation comprises performing another user authentication of the user based upon the at least one authentication mechanism.

8. The non-transitory computer-readable medium of claim 6, wherein the evaluation of the first security posture and the second security posture comprises a continuous evaluation of the VDI session after an initial startup of the VDI session.

9. The non-transitory computer-readable medium of claim 6, wherein the mitigation comprises pausing the VDI session until the non-compliant state identified by the evaluation is corrected.

10. The non-transitory computer-readable medium of claim 6, wherein the mitigation comprises generating a notification within the VDI session containing information about the non-compliant state identified by the evaluation.

11. A method, comprising:
  authenticating a virtual desktop infrastructure (VDI) session associated with a user based upon at least one authentication mechanism;
  obtaining a first security posture of a user account associated with the VDI session;
  obtaining a second security posture of at least one of a network or a client device from which the user account is connecting to the VDI session;
  performing an evaluation of the first security posture and the second security posture;
  determining that a mitigation procedure is required based upon identifying a non-compliant state by the evaluation of the first security posture and the second security posture;
  identifying a mitigation based upon the evaluation; and
  performing the mitigation to at least one of the VDI session, the user account, or the client device, wherein the mitigation comprises terminating the VDI session after a timeout period and wherein the timeout period is extended or eliminated in response to the user correcting the non-compliant state identified by the evaluation.

12. The method of claim 11, wherein the mitigation comprises performing another user authentication of the user based upon the at least one authentication mechanism.

13. The method of claim 11, wherein the evaluation of the first security posture and the second security posture comprises a continuous evaluation of the VDI session after an initial startup of the VDI session.

14. The method of claim 11, wherein the mitigation comprises pausing the VDI session until a non-compliant state identified by the evaluation is corrected.

* * * * *